F. A. BROWN & A. F. WAGNER.
AUTOMATIC GEAR SHIFTING DEVICE.
APPLICATION FILED MAY 8, 1914.
1,190,100. Patented July 4, 1916.
2 SHEETS—SHEET 1.
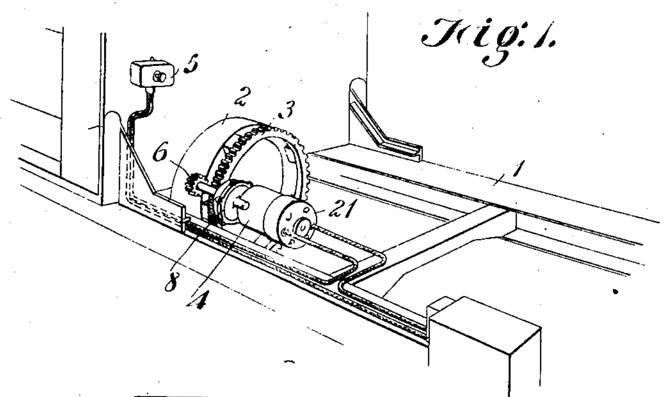
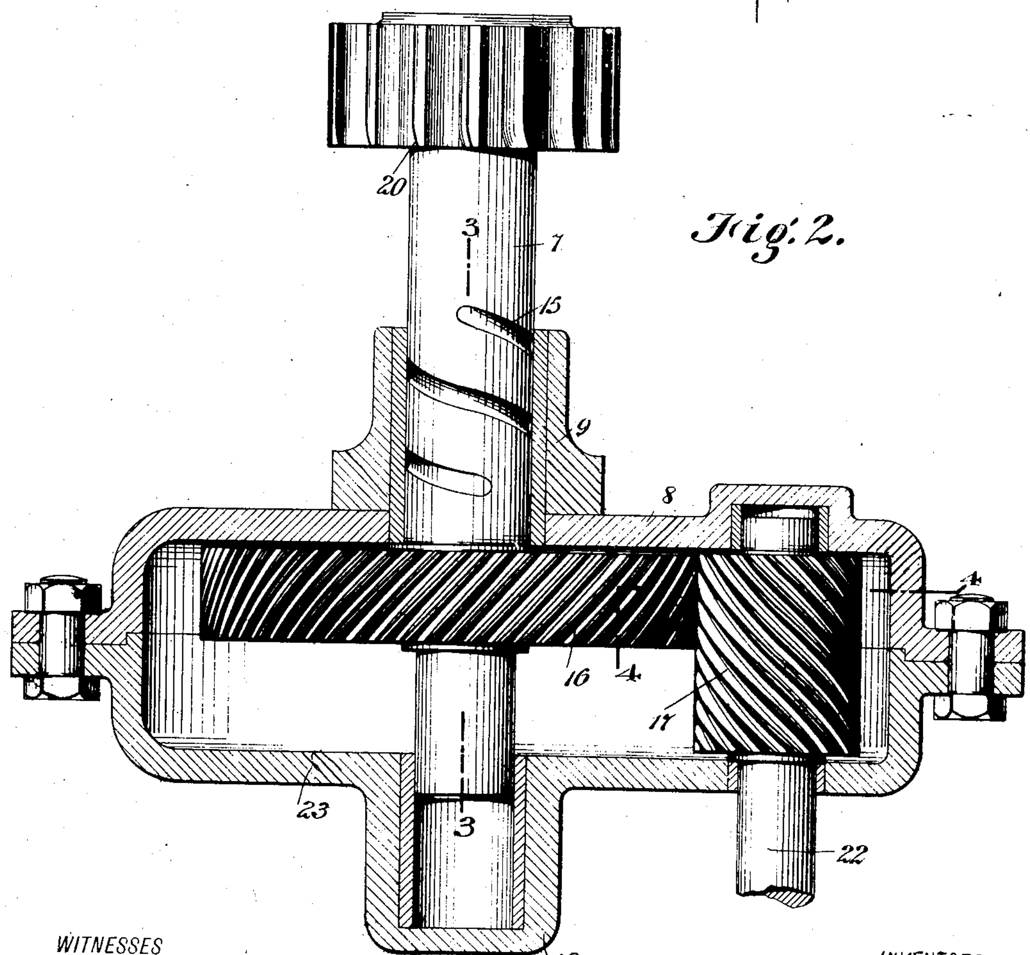
WITNESSES
G. R. Pierce
A. L. Kitchin
INVENTORS
FRED A. BROWN
ALBERT F. WAGNER
BY Munn & Co
ATTORNEYS F. A. BROWN & A. F. WAGNER.
AUTOMATIC GEAR SHIFTING DEVICE.
APPLICATION FILED MAY 8, 1914.
1,190,100. Patented July 4, 1916.
2 SHEETS—SHEET 2.
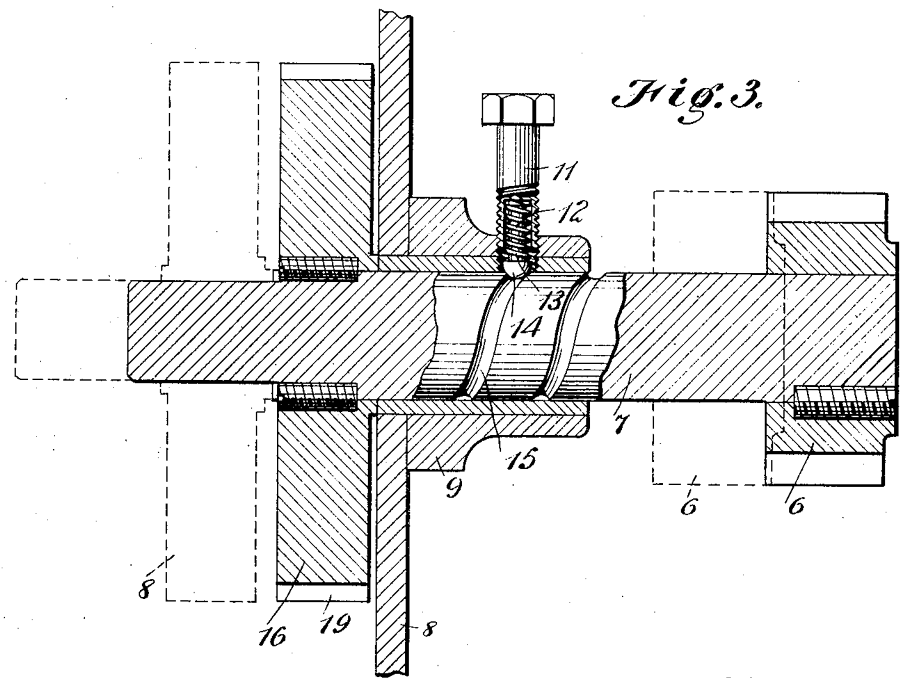
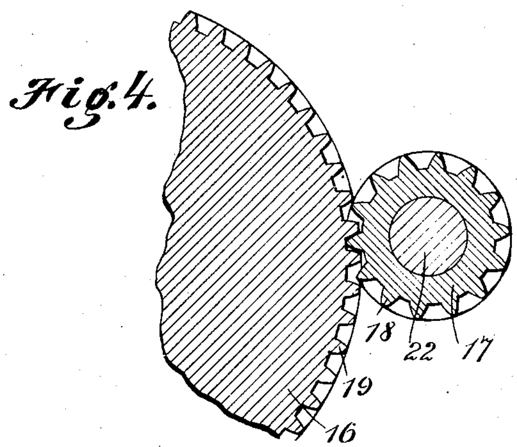
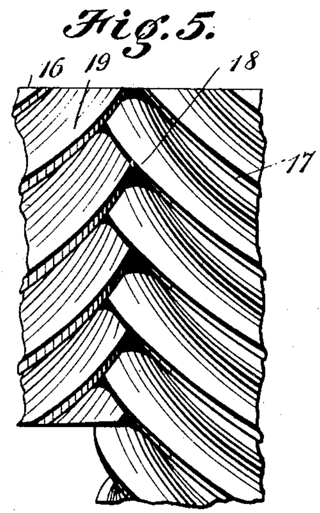
WITNESSES
G.R. Pierce
A.L. Kitchin
INVENTORS
FRED A. BROWN
ALBERT F. WAGNER
BY Munn & Co
ATTORNEYS

UNITED STATES PATENT OFFICE.

FRED A. BROWN AND ALBERT F. WAGNER, OF NEW YORK, N. Y.

AUTOMATIC GEAR-SHIFTING DEVICE.

1,190,100. Specification of Letters Patent. Patented July 4, 1916.

Application filed May 8, 1914. Serial No. 837,181.

*To all whom it may concern:*

Be it known that we, FRED A. BROWN and ALBERT F. WAGNER, both citizens of the United States, and residents of the city of New York, borough of Manhattan, county and State of New York, have invented a new and Improved Automatic Gear-Shifting Device, of which the following is a full, clear, and exact description.

This invention relates to improvements in gear shifting devices, and has for an object to provide an improved quick acting structure for shifting the starting mechanism of an automobile into action and out of action.

A further object of the invention is to provide an improved gear shifting device wherein when the power is turned on the starting device, the gears will be automatically shifted into engagement, and when the power is turned off said gears will be automatically disconnected.

In carrying out the objects of the invention the gear shifting device may be connected to any kind of machinery, and is adapted to cause the driving pinion of the starting mechanism to be shifted into mesh and out of mesh with one of the gears of the mechanism to be started or operated. The pinion just mentioned is connected with a longitudinally movable shaft which is rotated by a suitable spiral gear meshing with a second spiral gear, which in turn is driven by a motor of any desired description. By the use of the spiral gears the shaft on which the driving pinion is mounted is caused to move longitudinally when the pinion is retarded in its rotation, one of the gears acting as a cam in respect to the other. This cam action is utilized both for throwing the pinion into mesh and out of mesh so that when the starting motor is operated the pinion will be thrown into mesh, and when the speed of the gear wheel on the engine exceeds the speed of the pinion, the pinion will automatically move out of mesh.

In the accompanying drawings Figure 1 is a perspective view of part of an automobile and an embodiment of the invention associated therewith; Fig. 2 is a longitudinal horizontal section through the spiral gears and associated mechanism embodying certain features of the invention; Fig. 3 is a sectional view through Fig. 2 approximately on line 3—3); Fig. 4 is a detailed fragmentary sectional view through the gears shown in Fig. 2, such section being taken approximately on line 4—4 of Fig. 2; Fig. 5 is an enlarged fragmentary top plan view of the gear shown in Fig. 2 at the point of meshing.

Referring to the accompanying drawings by numerals, 1 indicates an automobile of any desired construction which is provided with an engine of any suitable structure not shown, such engine being formed with the usual fly wheel 2. Connected with the fly wheel 2 is a gear ring or wheel 3 used in starting or turning over the engine. Associated with the gear wheel 3 is a starting mechanism 4, which starting mechanism is adapted to be automatically brought into engagement or meshed with gear wheel 3 when the switch 5 is turned on, and to be moved out of engagement with gear wheel 3 when switch 5 is opened. The starting mechanism 4 is provided with a driving pinion 6 (Fig. 2) which is keyed or otherwise rigidly secured to shaft 7, which shaft is journaled in any suitable manner in housing 8. Housing 8 may be supported upon the automobile 1 in any desired manner. If desired, the housing or casing 8 may be mounted upon a suitable bracket so that pinion 6 may be swung toward and from the gear 3, and thereby allow different sized gears to be used, or allow the starting device to be readily attached to machines provided with either a large or small starting gear wheel. The shaft 7 is provided with a bearing 9, and also a bearing 10 which allows the shaft to be moved longitudinally as well as to rotate. Suitable bearing boxes may be provided, if desired, without departing from the spirit of the invention.

In forming the bearing box 9 an aperture is provided therein which accommodates a screw 11 (Fig. 3) which screw is provided with a longitudinal bore accommodating spring 12, which spring continually acts on a pin 13 having a head 14 adapted to fit into the groove 15. The pin 13 is adapted to provide a sufficient friction for causing the gear wheels 16 and 17 to move shaft 7 longitudinally, but to insure this motion the pin 13 fits into groove 15, which groove is spiral and naturally causes a longitudinal movement of the shaft when the shaft is rotated. If desired, a ball could be used in place of the pin 12. Any desired pressure may be provided for pin 13 by screwing in or out the screw 11. In forming the spiral gears 16 and 17 the spiral gear 17 is preferably made approximately twice as long as spiral gear 16 is wide, and thereby causes a proper longitudinal movement of shaft 7, which movement extends from one side of the housing 8 to the other. The action between the teeth of the gears 16 and 17 is that of a cam when the pinion 6 is being moved into mesh or out of mesh, and at other times the action of gears. In Fig. 5 it will be observed that the teeth 18 of gear 17 are adapted to press against the teeth 19 of gear 16, and if gear 16 is held against rotation the action of teeth 18 will be that of a moving cam against an inclined or cam face. By this construction and arrangement the wheels 16 and 17 act in a double capacity, namely, as cams for causing a longitudinal movement of shaft 7, and as gears for rotating the shaft 7 during the starting operation. In order to assist pin 13 in preventing any considerable rotation of shaft 7 during the longitudinal movement of the shaft the teeth of pinion 6 are rounded at 20 so as to more readily mesh with the teeth of the gear ring 3.

In operation when it is desired to turn over the engine, switch 5 is closed and motor 21 (Fig. 1) begins to rotate. Motor 21 may be of any desired type, as for instance the usual electric motor found in starting devices of various kinds. Motor 21 is connected with shaft 22 on which the gear 17 is mounted. The connection between gear 17 and shaft 22 is of course rigid, and when shaft 22 is rotated by the motor gear 17 will act on gear 16. As gear 16 is partially held against rotation by pin 13, and also by the usual friction of the bearings of shaft 7 the action of gear 17 against gear 16 will be that of a cam and cause a slow rotative movement of gear wheel 16 and a longitudinal movement of shaft 7. It is to be noted that pinion 6 will mesh with the gear 3 after the same has moved a very short distance, and when pinion 6 is brought into mesh with the gear 3 the rotation of shaft 7 is stopped until the gear 16 is pressing against side 23, whereupon the gear wheel 16 will be rotated together with shaft 7 and thereby rotate the gear 3. The motor 21 is kept running by holding switch 5 closed until the pinion 6 has rotated gear 3 sufficiently to turn over the engine and thereby allow a proper action thereof. As soon as the engine begins to move of itself switch 5 is opened and consequently motor 21 is stopped. This stopping of motor 21 will cause the gear 17 to stop its rotation or at least resist any rotative movement transmitted thereto by gear 16, and will act as a cam for moving gear wheel 16 back to its original position shown in Fig. 2 and pinion 6 out of mesh with gear 3. The pin 13 held by screw 11 is designed to co-act with the groove 15 and assist in causing a longitudinal movement of shaft 7 until the pinion 6 has meshed to a small extent with the teeth of gear wheel 3, whereupon the cam action of gears 16 and 17 will cause a quick longitudinal movement of shaft 7, whereby the gears 3 and 6 will be quickly brought into mesh. By this construction and arrangement a closing of the circuit of motor 21 at circuit 5 will cause the turning over of the engine of the automobile. It will be observed that there is no manually operated clutch used, nor is it necessary to use care in bringing the gears into mesh as all of this is taken care of automatically. The moment that the switch 5 is closed a longitudinal movement of shaft 7 and a slight rotative movement thereof will commence. This allows the gear 6 to be brought into mesh with gear 3, while both gears are stationary. After the longitudinal movement of shaft 7, the starting motor will cause a rotative movement thereof and quickly turn over the engine.

The starter has been described in connection with an automobile, and an automatic engine where the same is especially desirable, but it will be evident that the starter can be used upon various other machines without departing from the spirit of the invention.

What we claim is—

1. In a device of the character described, the combination with a driven member, of a driving member, a shaft rigidly connected with said driving member, means engaging said shaft for causing a longitudinal movement of said shaft during the first part of the rotation thereof, a gear wheel secured to said shaft, and a driving pinion meshing with said gear wheel, said pinion being of a width to remain continually in mesh with said gear wheel regardless of the position of the gear wheel and said shaft.

2. In a device of the character described, the combination with a driven member, of a driving member, a shaft connected rigidly with said driving member, means engaging said shaft for resisting the rotation thereof, a spiral gear rigidly secured to said shaft, a spiral pinion meshing with said spiral gear, and means for rotating said spiral pinion, whereby said spiral pinion will act in connection with said spiral gear as a cam for moving the spiral gear and the shaft carried thereby longitudinally for causing said driving member to engage said driven member.

3. In a device of the character described, the combination with a driven member, of a driving member, a shaft rigidly secured to said driving member, said shaft having a spiral groove arranged therein, a spring pressed pin extending into said groove, and means for rotating said shaft, said pin acting in said spiral groove causing said shaft to be moved longitudinally as the same is rotated, whereby said driving member is brought into engagement with said driven member.

4. In a device of the character described, the combination with a driven member, of a driving member, a shaft rigidly secured to said driving member, said shaft being provided with a spiral groove, a spring pressed pin fitting into said spiral groove for partially resisting the rotation of the shaft, and for causing a longitudinal movement of the shaft when the shaft is rotated, a spiral gear secured to said shaft, a spiral pinion meshing with said gear, means for rotating said spiral pinion, whereby said shaft is rotated and moved also longitudinally, and means co-acting with said spiral gear for limiting the longitudinal movement of said shaft.

5. In a device of the character described, the combination with a driven member, of a driving member, a shaft connected with said driving member, means for partially resisting the rotation of said shaft, a spiral gear rigidly secured to said shaft, a spiral pinion meshing with said spiral gear, means for rotating said spiral pinion, said spiral pinion acting for part of its movement as a cam, whereby said spiral gear and the shaft carried thereby are moved longitudinally of the shaft, and means co-acting with said spiral gear for limiting the longitudinal movement of said shaft, whereby said driving member may be brought into engagement with said driven member and moved out of engagement therewith.

In testimony whereof we have signed our names to this specification in the presence of two subscribing witnesses.

FRED A. BROWN.
ALBERT F. WAGNER.

Witnesses:
JOHN NEILSON,
A. L. KITCHIN.